(12) United States Patent
Quartiero

(10) Patent No.: US 12,260,373 B2
(45) Date of Patent: Mar. 25, 2025

(54) APPLICATION COLLABORATION SYSTEM AND RELATED METHOD

(71) Applicant: DS GROUP S.p.A., Milan (IT)

(72) Inventor: Romeo Quartiero, Milan (IT)

(73) Assignee: DS GROUP S.p.A., Milan (IT)

(*) Notice: Subject to any disclaimer, the term of this patent is extended or adjusted under 35 U.S.C. 154(b) by 366 days.

(21) Appl. No.: 17/857,297

(22) Filed: Jul. 5, 2022

(65) Prior Publication Data
US 2023/0004939 A1 Jan. 5, 2023

(30) Foreign Application Priority Data
Jul. 5, 2021 (EP) .................................... 21425032

(51) Int. Cl.
*G06Q 10/10* (2023.01)
*H04L 67/50* (2022.01)
*H04N 7/15* (2006.01)

(52) U.S. Cl.
CPC .......... *G06Q 10/103* (2013.01); *H04L 67/50* (2022.05); *H04N 7/152* (2013.01)

(58) Field of Classification Search
None
See application file for complete search history.

(56) References Cited

U.S. PATENT DOCUMENTS

| | | | |
|---|---|---|---|
| 9,667,676 B1* | 5/2017 | Lo | G06F 3/1454 |
| 10,860,958 B2* | 12/2020 | Choi | G06Q 50/01 |
| 2012/0260195 A1* | 10/2012 | Hon | G06F 16/954 |
| | | | 715/753 |
| 2014/0184720 A1* | 7/2014 | Dasgupta | H04N 7/15 |
| | | | 348/14.1 |
| 2015/0046280 A1 | 2/2015 | Alston | |
| 2015/0149565 A1 | 5/2015 | Ahmed | |
| 2017/0371891 A1* | 12/2017 | Yazganarikan | G06F 16/185 |
| 2021/0397402 A1* | 12/2021 | Ashkenazi | H04L 65/80 |

OTHER PUBLICATIONS

European Patent Office, "Search Report", in Application No. 21425032. 6, dated Jun. 28, 2022, 3 pages.

* cited by examiner

*Primary Examiner* — Toan H Vu
(74) *Attorney, Agent, or Firm* — Patterson & Sheridan LLP.; Malgorzata A. Kulczycka (57) ABSTRACT

An application collaboration system comprises at least one manager device and at least one user device, being connected to a common server, each one through at least one communication channel, and configured to implement shared use functions that are in common with each other and manager use functions and user use functions that are different from each other, the manager device comprising a first communication interface with the common server, and the user device comprising a second communication interface with the common server, the communication interfaces being configured to display and operate on the shared use functions on the manager device and the user device respectively.

16 Claims, 3 Drawing Sheets

APPLICATION COLLABORATION SYSTEM AND RELATED METHOD

BENEFIT CLAIM

This application claims the benefit under 35 U.S.C. 119 of European patent application 21425032.6, filed Jul. 5, 2021, the entire contents of which are hereby incorporated by reference for all purposes as if fully set forth herein.

BACKGROUND

Technical Field

The present disclosure refers to an application collaboration system adapted to carry out an enhanced and customised communication between two users.

The present disclosure is applicable in all contexts where a collaboration among users with different functions in the communication is required, in particular, but not limited to, the e-commerce sector, the education sector and the consulting sector.

The present disclosure also refers to a related application collaboration method.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Nowadays, and especially in recent times, the sector relating to all those systems that allow for the establishment of remote communication and/or collaboration has developed overwhelmingly.

Starting from the strongly felt need to create a type of communication able to replicate as much as possible the possibilities of two users who interface in person, various platforms have been developed to collaborate remotely and to carry out a real videoconference in order to get as close as possible to a face-to-face meeting.

In this sense, these platforms have also been provided with specific functions that make it possible to carry out a videoconference with a plurality of users that are simultaneously connected to the same collaboration "room", allowing each of them to select their own customised background.

Further, functions have been developed that allow a user to share with other users of a videoconference a view of the display of his device so as to allow everyone to see what a particular user is doing and understand more immediately something he is possibly explaining.

All currently available platforms are developed, irrespective of the number of participants in a specific conversation and/or collaboration, on an equal "round table" structure, with all users using the same interface to adopt a plurality of functions that are common to all that allow a conversation and a mutual comparison.

Although this is the goal, for instance, for a meeting among colleagues, it is also true that there are different types of collaboration and conversation, especially for those cases where the user of the platform has a different function and therefore has specific needs related to his function.

For example, in the increasingly developed world of e-commerce, where a customer may be in connection with a seller, it is clear that both will have different roles within the conversation and that therefore the current communication platforms are not suitable to realise the most appropriate interaction between the two users.

The same need may be found in education contexts where a teacher and a student may have different needs to be met in order to optimise the collaboration relationship.

BRIEF SUMMARY

A system and a method that can provide two users with different possibilities of use depending on their role in a collaboration are discloses.

The system and method may enable two users to adopt a common set of information in a coordinated but differentiated manner.

The system and method may also enable two users to be able to keep information for which an exchange is not requested as confidential.

The system and method may be also suitable for a plurality of applications.

More particularly, according to an aspect of the disclosure, the system and method may provide for the use of a common collaboration track on which each user can intervene with different options.

The application collaboration system may comprise at least one manager device and at least one user device, the manager device and the user device being connected to a common server, each one through at least one communication channel, with the common server that puts the manager device and the user device in communication.

According to an aspect of the disclosure the manager device and the user device may be enabled to implement shared use functions that are in common with each other and manager use functions and user use functions that are different from each other.

The manager device may in particular comprise a first interface of communication with the common server, and the user device may comprise a second interface communication with the common server.

According to another aspect of the disclosure, the first communication interface and the second communication interface can display the shared use functions on the manager device and on the user device respectively, the first communication interface being able to display and operate on the manager use functions on the manager device and the second communication interface being able to display and operate on the user use functions on the user device.

According to another aspect of the disclosure, this system may thus allow in a collaboration among users to each of them to display their own customised interface, such interfaces may contain a set of common options that ensure the collaboration through coordinated tools, but also may contain a set of specific options that allow to each of them to fulfil their role without forced display on both devices or the plurality of connected devices.

According to yet another aspect of the disclosure, the system may further comprise an RTC WEB server comprising at least one API library, and the manager device and the user device may further comprise reciprocal video and audio communication means associated with the first communication interface and with the second communication interface adapted to carry out a video conference among users simultaneously with the management of the first communication interface and of the second communication interface.

Therefore, a communication through the respective interfaces can be implemented by superimposing or aggregating an audio and/or video communication among users who can simultaneously view their own interface and hear and/or see via communication means associated with the same interface the other user(s) is provided.

According to another aspect of the disclosure, the system may further comprise a storage database adapted to contain a plurality of first data accessible for the manager device and/or for the user device.

The system may comprise, for example in the e-commerce context, a database containing a listing or even images relating to a plurality of products that can be viewed and used by both or only by one between the manager device and the user device.

The system may further comprise a third support device, optionally connected in background only with the manager device.

The user of the manager device could thus have a simultaneous communication on the part of a support user via the same interface simultaneously and in one embodiment without that support user to have an interaction with the user of the user device.

The system may further comprise network connection means for the common server and the manager device and/or the user device.

Connections between devices that are far apart and not connected to a common internal network and to a server that is also remotely connected may be therefore allowed.

According to a further aspect of the disclosure, an application collaboration method may comprise the following steps:
 making available a manager device comprising a first communication interface;
 making available a user device comprising a second communication interface;
 making available a common server;
 accessing the common server via the manager device;
 accessing the common server via the user device;
 connecting the manager device and the user device via the common server;
 coordinating in real time shared use functions that are common to the first communication interface and to the second communication interface;
 managing manager use functions and user use functions that are specific and different for the first communication interface and the second communication interface respectively, the manager use functions and the user use functions being visible and accessible only by the respective interface.

Advantageously, the method according to the disclosure may allow two devices with the respective video interfaces and the related communication options to connect to each other by interposition of the common server and to operate in a coordinated and diversified manner according to the collaboration and communication needs.

Preferably, the method may further comprise the step of connecting the manager device and the user device to the network.

According to another aspect of the disclosure, the access to and the use of a plurality of functions may be provided, such functions being available on the network to be exploited via the first communication interface and the second communication interface.

According to yet another aspect of the disclosure, the method may further comprise a step of putting the manager device and the user device in communication via video and audio superimposing the communication with the operations carried out by means of the first communication interface and the second communication interface.

It should be thus possible to establish a real videoconference between two or more users, who, however, always collaborate through differentiated interfaces, varying and optimising the prerogatives underlying the platforms according to the prior art.

According to an aspect of the disclosure, the method may further comprise the step of storing a plurality of first data within a storage database.

In this way, it should be possible to provide a plurality of first data, generally entered in advance through one or more manager devices and which can be accessible either only by a manager-type device or even by a user device, depending on the type of collaboration desired.

According to a further aspect of the disclosure, the shared use functions may comprise accessing the first data within the storage database by means of the manager device and/or the user device, and manipulating the first data to generate one or more customised second data.

The method according to the disclosure does not only allow a passive exploitation of the first data with their display but a real exploitation thereof, for example, by means of combinations and aggregations or as pointers for other data in the storage database, so as to define real second data.

According to another aspect of the disclosure, the method may further comprise a step of storing and analysing the first data and the second customised data to generate third data having assimilation features that are common to the second customised data, assimilation features being features that are linked according to a preset selection criterion.

The method according to the disclosure may not stop at the creation of the second data but may provide for a subsequent step of analysis in order to extrapolate a number of features that distinguish such second data and generating in a totally new way or by scanning all the data of the database third data that comprise the defined assimilation features.

According to another aspect of the disclosure, the method may comprise a step of putting a third support device in communication with the manager device and, optionally, the user device.

In this way, an additional communication channel may be provided superimposed on the conversation that is shared between one or more users which allows a multiple collaboration with more managers for a single user or, in one embodiment, also a differentiated dedicated collaboration which can also facilitate the role of a user of a manager device who may, for example, still be inexperienced in the use thereof.

According to an aspect of the disclosure, the method may further comprise a step of realising a return data stream sent to the first communication interface comprising a reconstruction of a portion of the second communication interface.

In order to facilitate the use of its own interface by a user of a user device, a portion of this interface could be also shared with the user of a manager device so as to allow the steering more quickly for the selection of the desired options.

The method may further comprise a step of interrupting the return data stream under preset confidentiality conditions.

A series of conditions may be set, that can occur in particular situations of a collaboration and/or conversation, such as, for example, a payment situation with the necessary entry of sensitive data by a user, wherein the method according to the disclosure guarantees that any communication with the manager device is interrupted and that it is possible to operate in total confidentiality.

According to a further aspect of the disclosure, the method may comprise a step of training the common server by means of a neural network to automatically steer successive communication sessions between the same manager device and user device.

The method can therefore learn from the communications between the same devices so as to, if necessary, suggest operating options to speed up operations or to automatically implement improved changes for the collaboration and/or conversation.

Further features and advantages will become more apparent from the detailed description given below of a preferred, but not exclusive, embodiment of the application collaboration system and related method according to the present disclosure, with reference to the accompanying figures given by way of non-limiting example.

DETAILED DESCRIPTION

With reference to the appended figures, the numeral 1 globally and schematically indicates a first embodiment of an application collaboration system realized in accordance with the present disclosure, hereinafter referred to for sake of brevity as system 1.

Figure 1:
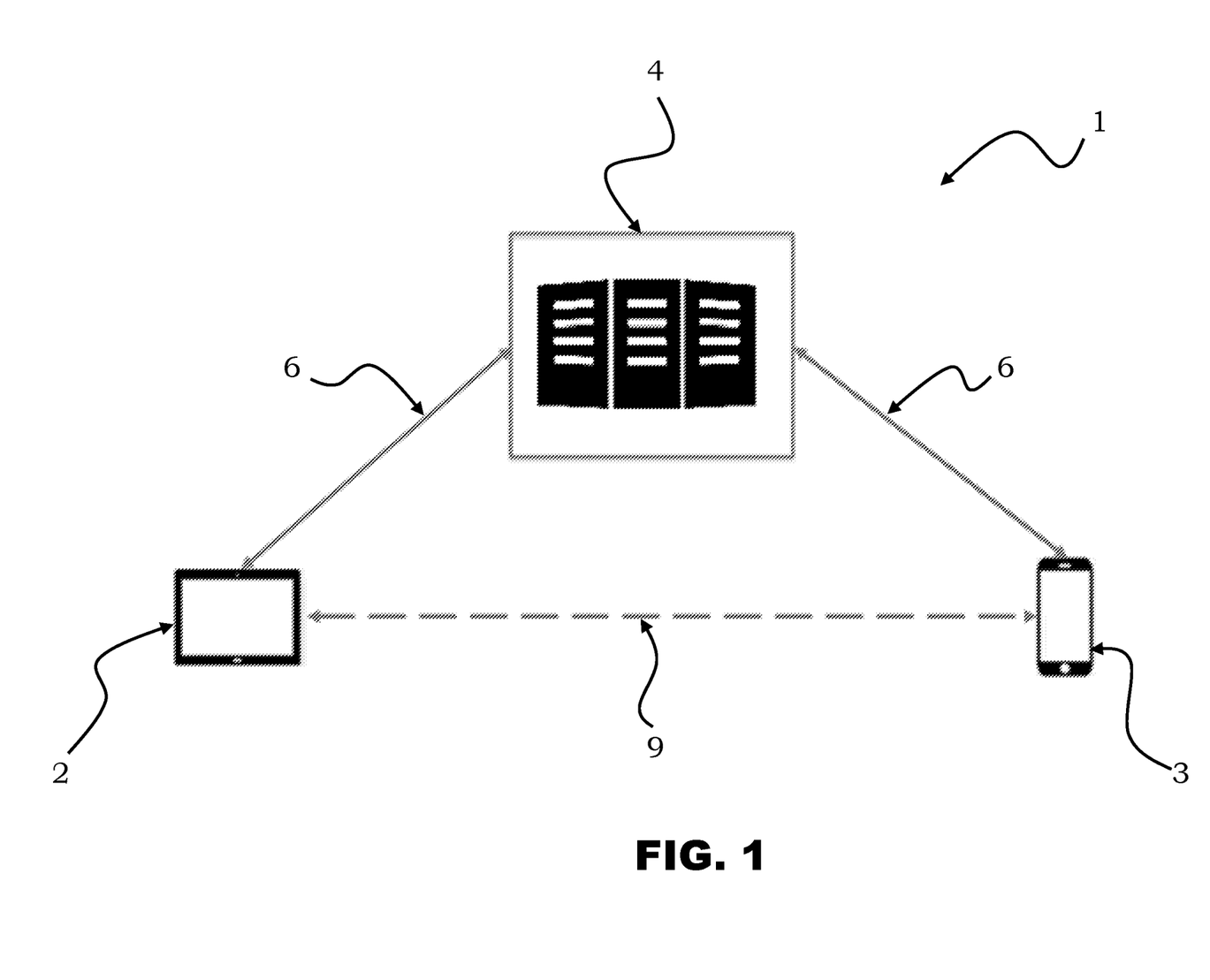
FIG. 1 shows an exemplary schematic representation of an application collaboration system according to the present disclosure.

The system 1 comprises a manager device 2 and a user device 3.

It is clearly possible to provide for more manager devices 2 and more user devices 3.

The manager device 2 and the user device 3 can indifferently be mobile, portable or fixed devices.

The manager device 2 and the user device 3 are respectively connected to a common server 4.

The common server 4 orchestrates the actions operated by the manager device 2 and by the user device 3 in a coordinated manner, thus allowing them to be put in communication.

Furthermore, the present embodiment provides network connection means 5 both for the common server 4 and for the manager device 2 and for the user device 3, which allow a connection between devices even from positions that are distant from one another and the connection to the common server 4 remotely.

The common server 4 is further configured to be accessible via a dedicated website.

In particular, the manager device 2 and the user device 3 preferably access the common server 4 via a web browser.

The common server 4 may comprise a plurality of servers in its inside, such as a web server or a server that allows, by implementing standard protocols, such as the STUN (RFC 3489) and TURN (RFC 8656) protocols, the identification of devices and allow the transmission of messages between them, even in the case of devices that do not directly display their own IP address on the network and/or that cannot communicate directly with each other.

With regard to the access to the common server 4, a different user profiling is preferably provided for the different devices, generally after explicit authentication for the manager device 2, and via a link generated ad hoc for the user device 3.

The connection of the manager device 2 and of the user device 3 with the common server is realised via a respective communication channel 6, also referred to as "socket".

Conveniently, the manager device 2 and the user device 3 are enabled to implement shared use functions that are in common with each other in addition to the manager use functions and user use functions that are different from each other.

Additionally, the manager device 2 provides a first communication interface 7 and the user device 3 comprises a second communication interface 8.

The first interface 7 and the second interface 8 of communication can be managed by a common application implementing the specific functionalities of the system 1, in particular of a responsive type, i.e., automatically adaptable to the device through which the application itself is used. Such a common application can be realised through Software Development Toolkits (or SDKs) that support responsive design.

The first interface 7 and the second interface 8 of communication can both display and operate with the shared use functions on the manager device 2 and on the user device 3, respectively.

The manager device 2 is further enabled to display and operate with the manager use functions via the first communication interface 7 while the user device 3 is further enabled to display and operate with the user use functions via the second communication interface 8.

In an application of the system 1 within a sales context the first communication interface 7 is an interface of a seller and is therefore different from the second communication interface 8 which is an interface of a potential buyer. Conveniently, these communication interfaces are also variable according to the functional need of the various sales phases.

In the present embodiment, the common server 4 also comprises a real-time communication server (WEB RTC protocol "Real-Time Communication") 15, hereinafter referred to as RTC server 15, and video and audio communication means 16. The RTC server 15 is preferably supported by an API library that allows the application to interact with the common server 4.

By means of the RTC server 15 and the video and audio communication means 16, the system 1 enables the exchange of information without transmission delays between the manager device 2 and the user device 3 and the realisation of a videoconference between the devices.

The system 1 therefore, in the present embodiment, for both the manager device 2 and for the user device 3, superimposes or aggregates to the aforesaid communication channel 6, representing an application collaboration component, a second communication channel 9, representing a video call component.

The two components are preferably displayed in two superimposed layers, with even more preferably the layer of the video call superimposed on the layer of the application collaboration, as it is generally smaller in size on each device. Nothing prevents, as mentioned above, a real aggregation of the layers in specific portions in the reciprocal first interface 7 and second interface 8 of communication from being provided.

In a preferred embodiment, the layer of the video call occupies only a limited space of an available screen, for example a box where a video of the two interlocutors participating in this video call is displayed.

The two components interact via an event-driven orchestration mode and therefore the two components intercept the actions performed by the users and behave accordingly.

Since an action carried out by a user has an effect not only on what is displayed by the user, but also on what is displayed by the interlocutor, each action is transmitted as mentioned through the respective communication channels, or sockets, 6, 9 used to transmit information among the users.

In the present embodiment, by adopting network connection means 5, so-called websockets are used as communication channels 6, 9, i.e. two software components that allow the transmission of data between different entities through a network, i.e. between two processes that operate on two separate machines, providing a standard mode, supported by most of the commonly used browsers, for the common server 4 to send contents to the browser without having to be prompted by the devices and allowing messages to come and go while keeping an open connection.

The websocket allows messages to be sent to a device without being explicitly requested by it, so that not only the effects of the actions carried out by the user operating on the client of that device can be seen on the browser of a device, but also the effects of the actions carried out by another user on another device and vice versa.

The websockets can be implemented using open source or commercial software libraries or the native functions made available to the programming languages.

It is pointed out that this mode of two-way communication is contrary to what normally occurs in a web application of known type, in which a user interacts with a web application by sending requests to a server via an http transport channel, the communication taking place according to a mechanism of requests from the client to the server-responses of the server to the client, and what is displayed on a client's screen depending on the actions (i.e. requests) made by the user operating on the client itself. Suitably according to the present disclosure, a websocket is used instead to realise the communication channels 6, 9, thereby allowing messages to be sent to a client without them being explicitly requested by the latter, and thus displaying on the browser of said client the effects of the actions carried out by the user operating on the client itself, but also the effects of the actions carried out by the user on another client.

In other words, by means of the present solution a "remote 4-handed" system is provided which is different from that proposed by the prior art which provides for two devices with similar interfaces that can share their own interface or co-browse. In fact, the system 1 provides differently for the manager device 2 and for the user device 3 and for the respective first interface 7 and second interface 8 of communication a technology such that they are always aligned, following the same stream, but being able to differentiate collaboration and conversation at any time and in every degree of freedom.

Further, the system 1 in the exemplary embodiment depicted comprises a storage database 10 adapted to contain a plurality of first data accessible for the manager device 2 and/or for the user device 3.

Such first data, in a sales application, may for example be represented by a product catalogue, which may only be available from the manager device 2, and thus from a seller for presentation to a potential customer, or also from the user device 3 in a collaborative view, and thus the display of the first data may be included among the manager or user use functions or among the shared use functions, respectively.

According to a preferred embodiment, the mentioned shared use functions comprise not only accessing and displaying the first data within the storage database 10 via the manager device 2 and/or the user device 3, but also manipulating them to generate one or more customised second data.

Additionally, the system 1 allows the manager device 2 and/or the user device 3 to store and analyse both the first data and the second customised data to generate third data having assimilation features that are common to the second customised data.

Assimilation features are features that are linked according to a preset selection criterion.

In the already mentioned sales application, for example, a seller or customer may aggregate two or more products into a single section of the respective first interface 7 and second interface 8 of communication, generating a second customised datum consisting of the aggregation of such first data and displayed on the first interface 7 and/or on the second interface 8 of communication.

In an even more specific context of selling clothes, for example, the seller can show the cross-referenced combination also with photos sent by the potential buyer in real time.

The first interface 7 and the second interface 8 of communication in a preferred embodiment provide, among the mentioned shared use functions, for composing an outfit, i.e., a coherent set of articles such as clothes, footwear and coordinated accessories dedicated to the customer in real-time collaboration and displaying every single step of this aggregation of first data for the composition of the third datum constituted by the final outfit.

The first interface 7 and the second interface 8 of communication allow the selection, the combination, the enlargement and the replacement of the first aggregate data consisting for example of product images.

The storage database 10 can contain not only single first data such as a listing of catalogue articles but also first data such as predefined sets comprising a series of articles preset as aggregates.

Additionally, it is possible for the user device 3, and thus for the customer via his second communication interface 8, to start from first data represented by sets of articles identified as eligible for a purchase.

The first interface 7 and the second interface 8 of communication can simultaneously display additional information linked to the first and second customised data generated, such as price and variants.

Once the second datum has been composed in the complex of an outfit, through the user device 3 and its second communication interface 8 it is possible to use this second datum in a global or partial way in a subsequent step, for example, of purchase of all or part of the components of the outfit corresponding to this second datum.

The system 1 also allows, as indicated above, to break down the type of aggregated second data, recognising common features that can be searched for by scanning the storage database 10 and searching for another possible combination of products in line with what has been aggregated.

This combination and selection can be automatically displayed on the first interface 7 and/or on the second interface 8 of communication, thus generating third data.

Figure 2:
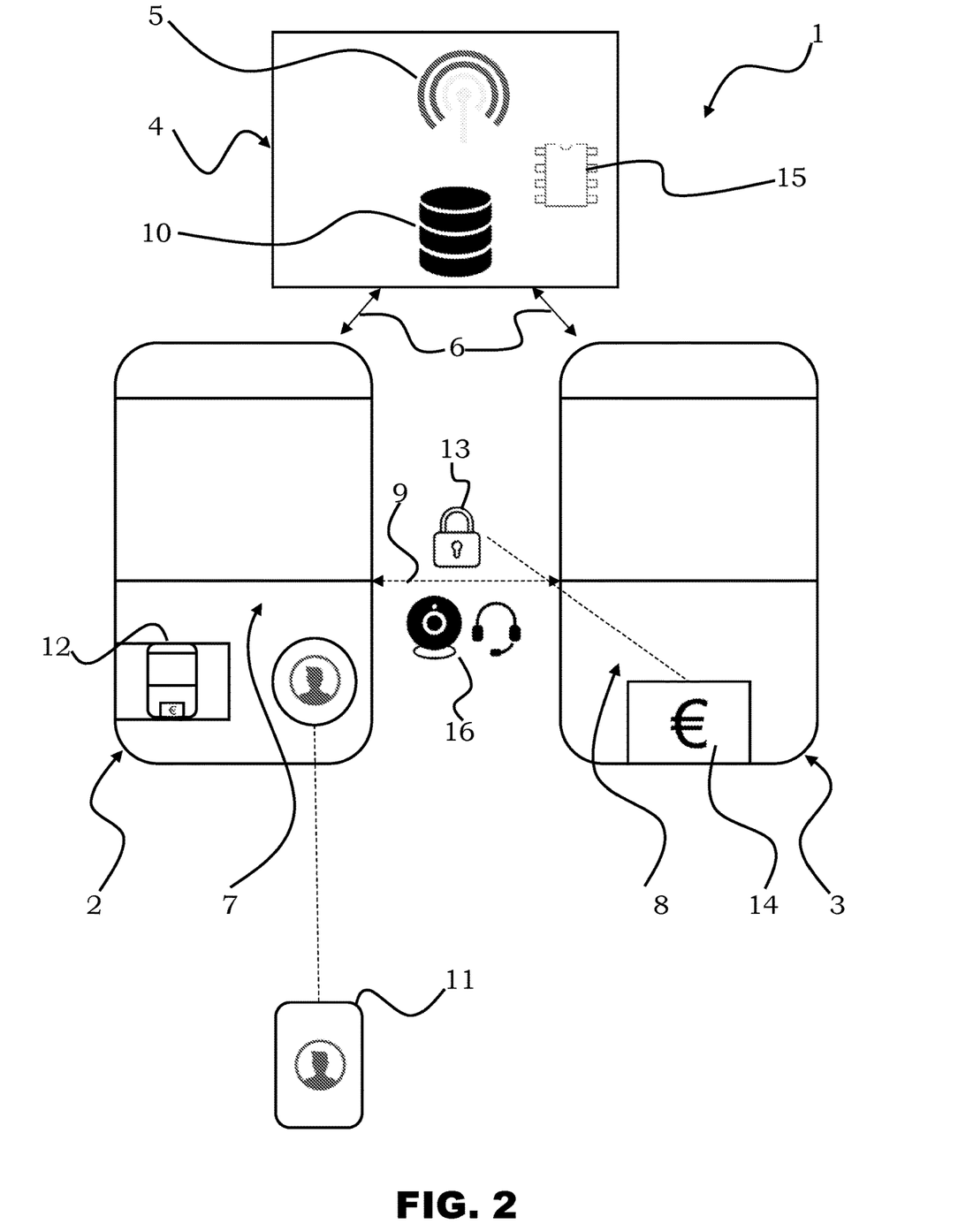
FIG. 2 shows another exemplary schematic representation of an application collaboration system according to the present disclosure.

In a further preferred embodiment, the system 1 further comprises a third support device 11, optionally connected in background only with the manager device 2.

In particular, in the already mentioned exemplary sales context, a seller may be joined by another support figure, the management of such further support figure in the present embodiment being part of the manager use functions, and optionally such support figure being visible only on the first communication interface 7 of the seller's device, thus being part of the manager use functions also not visible or implementable by the user device 3.

A video and/or audio channel associated only with the communication means 6 of the user device 2 is also adopted in this case.

The first communication interface 7 in a preferred embodiment may further provide a portion 12 intended to display a portion of the second communication interface 8 in real time.

This is not a sharing of such second interface 8 but a reconstruction of a portion thereof, thus not of other possible views of the user device 2, so as to ensure that the user of the manager device 2 in a collaboration phase is aligned with the operations performed by the user of the user device 3 and of the second interface 8 and possibly also suggest operations to speed up the use of the system 1.

In this way, again in the exemplary case of a system dedicated to sales, the seller can know in real time what is displayed on the customer's interface and thus align his explanations and the information he is providing to the customer with what he actually has seen on the screen thanks to his interface.

This option can clearly be interrupted.

In particular, the system 1 provides a blocking system 13 adapted to operate a step of interruption of the return data stream under preset confidentiality conditions.

For example, the user use functions may comprise, in a sales application, a payment portion 14 and a consequent step of entering sensitive data. The payment portion 14 in the embodiment shown herein is connected to the blocking system 13.

Again, in the embodiment shown, the common server 4 is further adapted to track and store the communication sessions between a manager device 2 and a user device 3.

The system is then able to break them down into a sequence of micro-activities and select those that produced a certain result, e.g., a sale or in another context, e.g., educational, the success of a question test.

These activity sequences are used for training the common server 4 by means of a neural network to automatically steer successive communication sessions between the same manager device 2 and user device 3.

Figure 3:
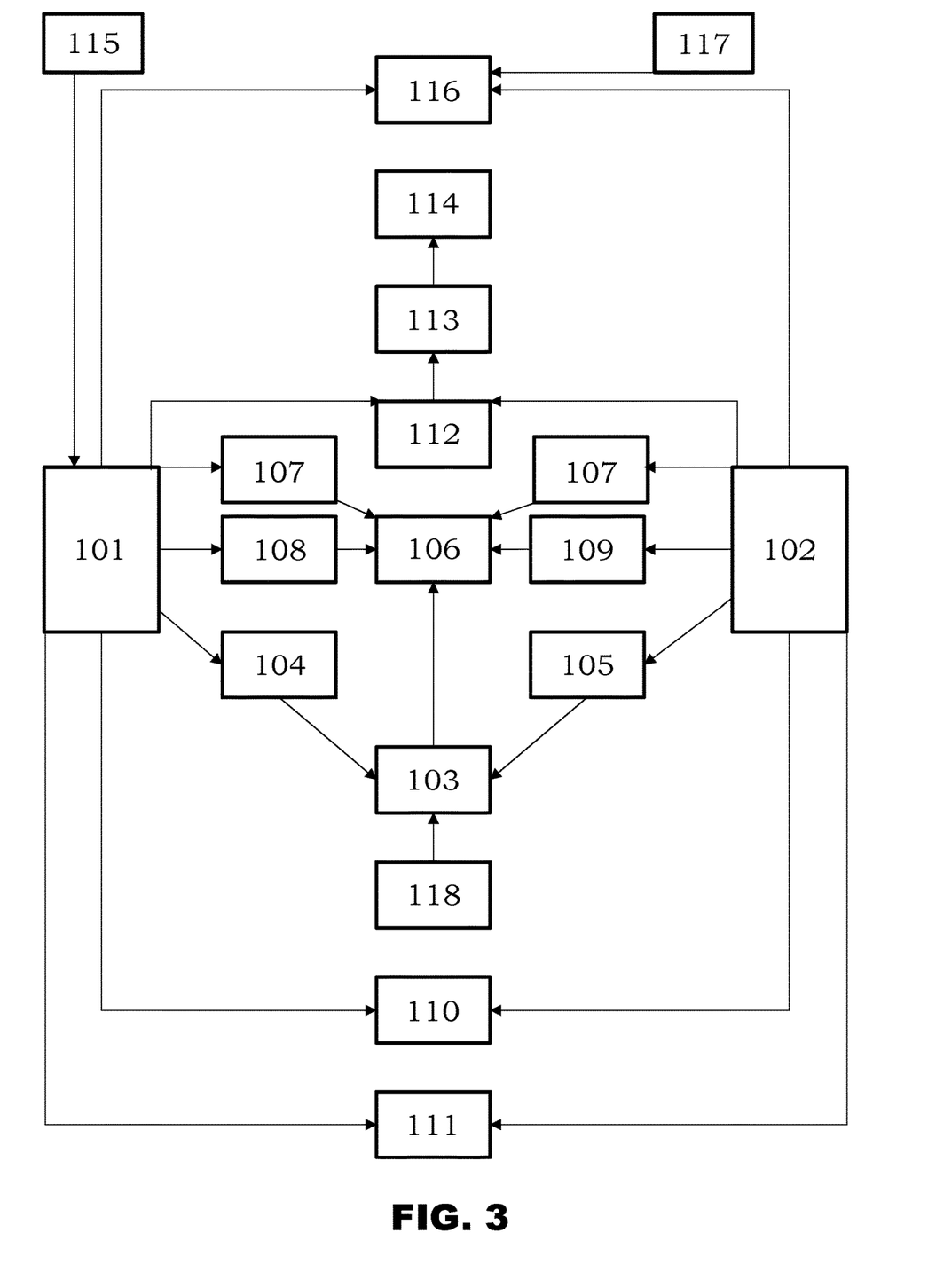
FIG. 3 shows a block diagram of an application collaboration method in an exemplary and non-limiting embodiment according to the present disclosure.

FIG. 3 illustrates, by means of a block diagram, the application collaboration method 100 underlying the present disclosure and which has been defined above applied to the application collaboration system 1.

This method first of all includes preparation steps such as making available 101 a manager device 2 comprising a first communication interface 7, making available 102 a user device 3 comprising a second communication interface 8 and making available 103 a common server 4.

The method 100 therefore comprises interfacing steps, namely accessing 104 the common server 4 via the manager device 2, accessing 105 the common server 4 via the user device 3 and connecting 106 the manager device 2 and the user device 3 via the common server 4.

The method 100 then provides for the real use steps that comprise coordinating 107 in real time shared use functions that are common to the first communication interface 7 and to the second communication interface 8, managing 108, 109 manager use functions and user use functions that are specific and different for the first communication interface 7 and the second communication interface 8 respectively, the manager use functions and the user use functions being visible and accessible only by the respective interface.

Furthermore, in the present embodiment the method 100 also comprises a step of connecting 110 the manager device 2 and the user device 3 to the network.

The connection respectively between the manager device 2 and the user device 3 with the common server 4 is further implemented with a step of putting the manager device 2 and the user device 3 in communication 111 via video and audio, superimposing the video communication to the operations carried out by the first communication interface 7 and the second communication interface 8.

At this point, the method 100 includes steps of exchanging and manipulating data via the respective first interface 7 and second interface 8 of communication, and specifically includes a step of storing 112 a plurality of first data within a storage database 10, a step of accessing the first data within the storage database 10 via the manager device 2 and/or the user device 3, and manipulating 113 the first data to generate one or more customised second data.

It is further possible to provide a step of storing and analysing 114 the first data and the second customised data to generate third data with assimilation features that are common to the second customised data, assimilation features being understood to mean features that are linked according to a preset selection criterion.

According to the present embodiment, as mentioned above it is further possible to provide for support steps, which specifically comprise putting a third support device in communication 115 with said manager device 2 and, optionally said user device 3 (the management of said input in the communication of the support device being however in the present embodiment the prerogative only of the first communication interface 7), and realising 116 a return data stream sent to the first communication interface 7 comprising a reconstruction of a portion of the second communication interface 8.

For security and privacy reasons, the method 100 further comprises a step of interrupting 117 the return data stream under preset confidentiality conditions.

In order to speed up then a communication and interfacing iteration between the same manager device 2 and user device 3 the method 100 also comprises a step of training 118 the common server 4 by means of a neural network to automatically steer successive communication sessions between the same manager device 2 and user device 3.

In conclusion, the application collaboration system and the related method, thanks to the superposition of a video call and data channels that guarantee the exchange of information between a manager device and a user device, makes it possible to achieve a sharing of contents to help the user, for example, in a sales negotiation, while guaranteeing the confidentiality of the information exchanged with the manager only.

Basically, appropriate applications are made available, both on the manager side and on the user side, through two distinct components, but which are orchestrated in a coordinated manner: a video call component and an application collaboration component, through which the users of the respective applications interact each with a specific visibility and right to action. Conveniently, the two components intercept the actions carried out by users and behave accordingly; in particular, actions carried out by a user have an effect not only on what is viewed by the user himself, but also on what is viewed by the interlocutor, thanks to the use of a websocket type communication channel, i.e. two software components that operate as 'communication channels' and allow the transmission of data between different entities through a network, i.e. between two processes operating on two separate machines, each action carried out by a user during a session being processed and if necessary generating a message that is sent to the interlocutor's application, thus affecting the use of the latter.

Conveniently, the manager-side application may provide for a connection by means of explicit authorisation, while the user-side application may be simplified by an access via a link generated ad hoc for each session.

In the particularly preferred field of application of sales, it is evident that the system and the method according to the present disclosure realize a one-to-one exchange between seller (manager) and buyer (user) and, while guaranteeing a sharing of content, keep the interaction strictly "intimate" and allow the buyer to appreciate the seller's competence and professionalism in a manner that is as similar as possible to a face-to-face sale.

Conveniently, all the sales phases are carried out thanks to the system and to the method according to the present disclosure, from the selection from a catalogue to the display of possible outfits up to the payment.

In addition, the system and the method proposed allow these outfits to be easily composed by selecting some articles and bringing the images to a predefined area, where these images can be combined, enlarged, replaced by colour variants available for the articles in a way such as to allow the buyer to verify the combinations. Conveniently, these outfits can be composed by choosing indiscriminately among the different sets of articles (for example by selecting an article from the catalogue, one from articles prepared by the seller, one from the articles saved "for later" by the seller for the customer in a previous session and one already in the customer's shopping bag).

When composing the outfit, the seller can show the buyer information (e.g., the price, the fact that an article is already in the buyer's shopping bag, the presence of colour variants) to facilitate the buyer's purchasing choices.

Once an outfit has been composed, all the articles that compose it or only some of them (always selected collaboratively between seller and buyer) can be brought into the so-called shopping bag so that the customer can reassess them (always having the possibility to modify the content of the shopping bag, therefore without binding it to the activities and the selections made previously) and proceed with the completion of the purchase if necessary.

It is pointed out that, unlike the current e-commerce platforms already available, the proposed system and method make it possible to achieve:
- a collaborative composition of an outfit, where both parties operate on the same application with specific role-dependent functionalities (seller, buyer);
- a 'realistic' visualisation of the outfit as a whole;
- the possibility of composing the outfit by selecting articles from several sets; and
- the possibility of enabling the display of additional information by the seller only or also by the buyer.

Conveniently, according to the disclosure, the presence of a tutor to assist the manager can also be ensured.

In addition, the system and the method according to the present disclosure provide for a return stream, which is not a classic screen sharing but an "application" information that the seller has as a feedback to be aware of the status of the buyer's screen and thus be able to adapt the communication with respect to the buyer, for example without having to ask the interlocutor if "the slide has arrived" or "the video has started", thus realising a high quality experience.

In conclusion, the present disclosure refers to an application collaboration system and method having the following main features:
- to allow two devices to be put in communication with each other and with a server having a set of information in its inside;
- to have two different interfaces on the two devices with functions that are in common and differentiated functions depending on one's role in the conversation;
- to generally allow a video/audio connection between users to be superimposed on each interface;
- in the case of a sale, for example, of garments to allow the seller and the user to select a number of garments to be displayed all together to create an outfit in a dedicated portion of the interfaces;
- therefore, to allow in this example to choose what to buy and always proceed along differentiated paths given the two interfaces but by mutual agreement until the end of this purchase.

Clearly, this is only an application example of the present disclosure and not a limitation thereof.

Conveniently, the return stream also ensures confidentiality at appropriate times, e.g., during the payment operations of a possible purchase, often managed by external systems, the display being then prevented in the return stream.

From the foregoing it will be appreciated that, although specific embodiments of the disclosure have been described herein for purposes of illustration, various modifications may be made without deviating from the spirit and scope of the disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

For example, as mentioned above, nothing prevents the realisation of a videoconference that comprises a plurality of manager devices and a plurality of user devices.

The invention claimed is:

1. An application collaboration system comprising:
a manager device having a first communication interface;
a user device having a second communication interface;
a common server; and
at least one communication channel,
wherein the manager device and the user device are connected to the common server, each one through the at least one communication channel and enabled to implement shared use functions that are in common with each other and manager use functions and user use functions that are different from each other,
wherein the first communication interface of the manager device and the second communication interface of the user device communicate with the common server and are configured to display and operate on the shared use functions on the manager device and user device respectively, the first communication interface being configured to display and operate on manager use functions on the manager device and the second communication interface being configured to display and operate on user use functions on the user device further comprising a storage database configured to contain a plurality of first data accessible for the manager device, or for the user device or for the manager device and for the user device;

wherein the shared use functions of the manager device and of the user device comprise accessing the first data within the storage database and manipulating the first data to generate one or more customized second data in said storage database; and wherein the manager device and/or the user device are further configured to analyze the first data and the customized second data to generate third data having assimilation features that are common to the customized second data, assimilation features being features that are linked according to a preset selection criterion.

2. The application collaboration system of claim 1, further comprising a WEB RTC server having at least one API library and wherein the manager device and the user device further comprise reciprocal video and audio communication means associated with the first communication interface and with the second communication interface configured to carry out a videoconference among users simultaneously with the management of the first communication interface and of the second communication interface.

3. The application collaboration system of claim 1, further comprising a third support device.

4. The application collaboration system of claim 3, wherein the third support device is connected in background only with the manager device.

5. The application collaboration system of claim 1, further comprising network connection means for the common server and for the manager device, or for the common server and for the user device or for the common server and for the manager device and for the user device.

6. An application collaboration method comprising the following steps:
   making available a manager device having a first communication interface;
   making available a user device having a second communication interface;
   making available a common server;
   accessing the common server via the manager device;
   accessing the common server via the user device;
   connecting the manager device and the user device via the common server;
   coordinating in real time shared use functions that are common to the first communication interface and to the second communication interface;
   managing manager use functions and user use functions that are specific and different for the first communication interface and the second communication interface respectively, the manager use functions and the user use functions being visible and accessible only by the respective communication interface;
   storing a plurality of first data within a storage database;
   wherein the shared use functions comprise accessing the first data within the storage database and manipulating the first data to generate one or more customized second data; and
   further comprising a step of:
   storing and analyzing the first data and the customized second data to generate third data having assimilation features that are common to the customized second data, assimilation features being features that are linked according to a preset selection criterion.

7. The application collaboration method of claim 6, further comprising a step of connecting the manager device and the user device to a network.

8. The application collaboration method of claim 6, further comprising a step of:
   putting the manager device and the user device in communication via video and audio, by superimposing the communication to the operations carried out through the first communication interface and the second communication interface.

9. The application collaboration method of claim 6, wherein accessing the first data within the storage database is made by means of the manager device or by means of the user device or by means of the manager device and by means of the user device.

10. The application collaboration method of claim 6, further comprising a step of:
    putting a third device in communication with the manager device or with the manager device and the user device.

11. The application collaboration method of claim 6, further comprising a step of:
    realizing a return data stream sent to the first communication interface comprising a reconstruction of a portion of the second communication interface.

12. The application collaboration method of claim 11, comprising a step of:
    interrupting the return data stream under preset confidentiality conditions.

13. The application collaboration method of claim 6, further comprising a step of:
    training the common server by means of a neural network to automatically steer successive communication sessions between the same manager device and user device.

14. An application collaboration method comprising the following steps:
    making available a manager device having a first communication interface;
    making available a user device having a second communication interface;
    making available a common server;
    accessing the common server via the manager device;
    accessing the common server via the user device;
    connecting the manager device and the user device via the common server;
    coordinating in real time shared use functions that are common to the first communication interface and to the second communication interface;
    managing manager use functions and user use functions that are specific and different for the first communication interface and the second communication interface respectively, the manager use functions and the user use functions being visible and accessible only by the respective communication interface;
    storing a plurality of first data within a storage database,
    wherein the shared use functions comprise accessing the first data within the storage database and manipulating the first data to generate one or more customized second data; and
    further comprising a step of:
    storing and analyzing the first data and the customized second data to generate third data having assimilation features that are common to the customized second data, assimilation features being features that are linked according to a preset selection criterion.

15. The application collaboration method of claim 14, further comprising a step of:

putting the manager device and the user device in communication via video and audio, by superimposing the communication to the operations carried out through the first communication interface and the second communication interface.

16. The application collaboration method of claim 14, further comprising a step of:

realizing a return data stream sent to the first communication interface comprising a reconstruction of a portion of the second communication interface; and interrupting the return data stream under preset confidentiality conditions.

\* \* \* \* \*